(12) United States Patent
Adams et al.

(10) Patent No.: US 8,925,471 B2
(45) Date of Patent: Jan. 6, 2015

(54) LOW TORQUE AND VACUUM SEED METER

(75) Inventors: Brian T. Adams, Centralia, MO (US); Keith W. Wendte, Willowbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 161 days.

(21) Appl. No.: 13/618,055

(22) Filed: Sep. 14, 2012

(65) Prior Publication Data

US 2014/0076219 A1     Mar. 20, 2014

(51) Int. Cl.
*A01C 7/16* (2006.01)

(52) U.S. Cl.
USPC ............................................... 111/185

(58) Field of Classification Search
USPC .......................................... 111/177–185, 170
See application file for complete search history.

(56) References Cited

U.S. PATENT DOCUMENTS

| 7,334,532 | B2 | 2/2008 | Sauder et al. |
| 7,478,603 | B2 | 1/2009 | Riewerts et al. |
| 7,854,066 | B2 | 12/2010 | Wendte |
| 8,166,896 | B2 | 5/2012 | Shoup |
| 2005/0204972 | A1 | 9/2005 | Eben et al. |
| 2005/0224510 | A1 | 10/2005 | Remis et al. |
| 2009/0090284 | A1 | 4/2009 | Peterson, Jr. et al. |
| 2011/0120356 | A1 | 5/2011 | Wendte et al. |
| 2011/0219994 | A1 | 9/2011 | Gilstring |

*Primary Examiner* — Christopher J Novosad
(74) *Attorney, Agent, or Firm* — Rebecca L. Henkel (57) ABSTRACT

A seed meter is provided for use with a row crop planter or seed planter that includes a seed disk assembly that rotates within a meter housing cavity and that has a seed disk assembly cavity in which a vacuum pressure is applied for pulling seeds into seed pockets of a seed disk of the seed disc assembly. The vacuum pressure is applied to the seed disk assembly by pulling a vacuum airflow through a spindle that supports the seed disk assembly. A wiper seal is arranged in a fixed position within the seed disk assembly cavity and seals against the seed disk assembly as a support plate and seed disk of the seed disk assembly rotate over the wiper seal, so that the wiper seal creates a boundary between a vacuum zone and a non-vacuum zone inside of the seed disc assembly cavity.

20 Claims, 5 Drawing Sheets

LOW TORQUE AND VACUUM SEED METER

FIELD OF THE INVENTION

The invention relates generally to row-crop planters or seeders and, in particular, to seed disk rotational mounting arrangements and air sealing assemblies for seed meters.

BACKGROUND OF THE INVENTION

Modern farming practices strive to minimize operating expenses. One way of reducing operating expenses is to operate the farm equipment at relatively faster speeds, which reduces the amount of operating time to complete certain tasks. When operating equipment at faster speeds, it can be important to maintain the quality of operation that can be achieved while operating at relatively slower operating speeds. This can be especially difficult to accomplish during planting and seeding operations that require precise seed depth placement and spacing accuracy in order to maintain a good seed environment. Accordingly, seed meter functionality can be very important in modern farming practices to obtain profitability.

Another way of reducing operating expenses is to use relatively more efficient farm equipment that requires less fuel to operate for a given operational time period when compared to less efficient equipment. Some seed meters create a negative pressure between a seed disk and a seed cover component of an outer housing of the seed meter. This tends to pull the seed disk against the seed cover outer housing component which creates a frictional braking force that must be overcome when rotating the seed disks of such typical seed meters. Attempts have been made to reduce those effects by providing seed meters with rotating vacuum chambers. Such seed meters apply a vacuum pressure to the entire inside space of the rotating vacuum chamber and require a complex array of numerous flexible fingers. Each flexible finger periodically bends to mechanically cover an individual opening of the seed disk to cut off vacuum to that opening, and has a wire that inserts into the opening to release the seed from the opening.

SUMMARY OF THE INVENTION

The present invention is directed to a seed meter which provides improved uniformity of seed placement during row crop planting and that is highly efficient so as to require relatively little power to operate when compared to less efficient seed meters. The seed meter may include a seed disk that is supported for low-drag rotation about a spindle by way of bearing assemblies. The seed disk may, itself, be connected to a seed disk hub in which the bearing assemblies are concentrically mounted for rotation about the spindle. The seed disk may be sealed at its outer periphery to the seed disk hub so that a space is provided between the seed disk and a back wall of the seed disk hub. A vacuum may be drawn through the center of the seed disk hub to create negative pressure in the space between the seed disk and seed disk hub back wall, for drawing seeds against the seed disk. In this way, the negative pressure of the seed meter is created within a rotating unitary seed disk assembly that is defined by the seed disk and the seed disc hub, which eliminates the seed disk from being drawn by vacuum against a stationary housing or other component of the seed meter. The fully sealed unit of the seed disk assembly may require relatively less input vacuum pressure to achieve sufficient vacuum pressure at each of multiple seed disk cells into which the seeds are drawn for being dispensed from the seed meter when compared to typical seed meters that have pressure differentials that are established across rotating components that engage fixed components of the seed meter, such as a seed disk and a fixed seed cover. The invention may therefore provide more efficient rotating assemblies that require less torque for rotating the seed disks and require less vacuum pressure to draw seeds against the seed disks so that the seed meters can be operated while using less power.

According to one aspect of the invention, a seed meter is provided that includes a housing assembly that includes a housing cavity therein and a seed disk assembly that is arranged for rotation inside of the housing cavity. The seed disk assembly includes a support plate that has a back wall and a seed disk that is mounted to the support plate so that the support plate back wall and seed disk are spaced from each other. A seed disk assembly cavity is defined in the space between the support plate back wall and seed disk. A wiper seal is arranged within the seed disk assembly cavity. The wiper seal extends between and engages each of the support plate back wall and the seed disk. This creates a sealed-off section of the seed disk assembly cavity so as to define a vacuum zone and a non-vacuum zone in the seed disk assembly cavity. In the vacuum zone, a vacuum pressure within the seed disk assembly pulls and holds seeds into openings in the seed disk. The non-vacuum zone may define a cutoff chamber such that in the non-vacuum zones, the seed disk assembly is at ambient or greater pressure, whereby the seeds are not held against the seed disk by vacuum pressure and the seeds can freely fall away from the seed disk to be deposited into a seed bed. By substantially confining the vacuum pressure between the seed disk and support plate that rotate in unison with each other, a frictional braking force between the seed disk and a fixed housing component may be avoided and the seed disc can be rotated with relatively less torque. The torque required to rotate the seed disk assembly may correspond to an amount needed to overcome frictional engagement of the wiper seal and the inwardly facing surfaces of the seed disk assembly.

According to another aspect of the invention, the housing assembly includes a spindle that is hollow and connected to a vacuum source and that extends inwardly into the housing cavity. The seed disk assembly may be mounted for rotation with respect to and operably connected to the spindle so that a vacuum airflow that is created by the vacuum source is drawn from the vacuum zone of the seed disk assembly and through the spindle of the housing assembly. This may provide a relatively low volume sealed rotating assembly in which the vacuum pressure is created in the seed meter which may require less power to create sufficient vacuum pressure to hold seed against the seed disk.

According to another aspect of the invention, the wiper seal is fixed with respect to the spindle so that the seed disk assembly slides across the wiper seal when the seed disk assembly rotates. The wiper seal may include a pair of opposing side edges that engage the seed disk assembly support plate and seed disk, and an end edge that engages a collar that extends from the support plate. The wiper seal may include a first segment that extends through the seed disk assembly cavity generally radially in a first direction and a second segment that extends through the seed disk assembly cavity generally radially in a second direction that is different from the first. The first and second segments of the wiper seal assembly define an angle of greater than about 90 degrees therebetween. The wiper seal may include a third segment that extends between and connects the first and second segments to each other, and the third segment may be arcuate and have a curvature that corresponds to an outer circumferential surface of the spindle. This may allow the wiper seal to seal off a relatively large portion of the seed disk assembly cavity, for example, at least about 25 percent, which may allow seeds to gravitationally fall away from the seed plate without requiring ancillary mechanical seed removal devices.

According to another aspect of the invention, an inner bracket may be arranged and fixed within the seed disk assembly cavity. The inner bracket may support the wiper seal from a position that is relatively nearer a central axis of the cavity than the wiper seal. An outer bracket may be arranged and fixed within the seed disk assembly cavity, and that supports the wiper seal from a position that is relatively further from the central axis of the cavity than the wiper seal. The wiper seal may be sandwiched between the inner and outer brackets engaging surfaces of the brackets that face toward each other. This may allow the wiper seal to be made from a relatively resilient material that provides a low frictional engagement with the support plate back wall and seed plate while being supported with sufficient rigidity so that the wiper seal does not buckle under the vacuum pressure influence and thus the seal integrity between the vacuum and non-vacuum zones can be maintained.

According to another aspect of the invention, the inner bracket may be mounted to the spindle and may include an opening that fluidly communicates with an opening of the spindle so that a vacuum airflow can be directed through the inner bracket and the spindle. In this way, the opening of the inner bracket faces toward the vacuum zone and may face radially, away from the spindle. The opening may be defined at an open, side of the inner bracket that has an elongate opening defined between a pair of side plates. The inner bracket may include a closed side that is defined by a solid wiper seal support wall that extends between the side plates and to which the wiper seal is mounted. The seal support wall may face toward the non-vacuum zone. This may provide a simple arrangement for separating the seed disk assembly into vacuum and non-vacuum zones while fixing the wiper seal so that is does not rotate but instead maintains a fixed position within the seed disk assembly cavity while support plate and seed disk rotate past the wiper seal.

According to another aspect of the invention, one or both of the inner and outer brackets may include an arm that supports a sensor that can detect whether a seed is present in each of the openings of the seed disk. Three arms may be provided, two extending from the inner bracket and the third extending from the outer bracket. This may allow a first sensor to be arranged before a singulator of the seed meter. If the first sensor senses that there are seeds missing from the seed disk openings before the singulator, it may indicate that there is not enough vacuum pressure being applied to pick up the seeds or not enough agitation in the seed meter so that the seeds have become clumped and stuck together. A second sensor may be arranged after the singulator. If the second sensor senses that there are seeds missing from the seed disk openings after the singulator, it may indicate that the singulator is set too aggressively and is knocking all of the seeds out of the openings. A third sensor be arranged in the non-vacuum zone. If the third sensor senses that there are seeds present in the seed disk openings, it may indicate that the vacuum pressure is too high, a seed is wedged into the seed disk hole, or that the seal integrity of the wiper seal has been compromised.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENT

Figure 1:
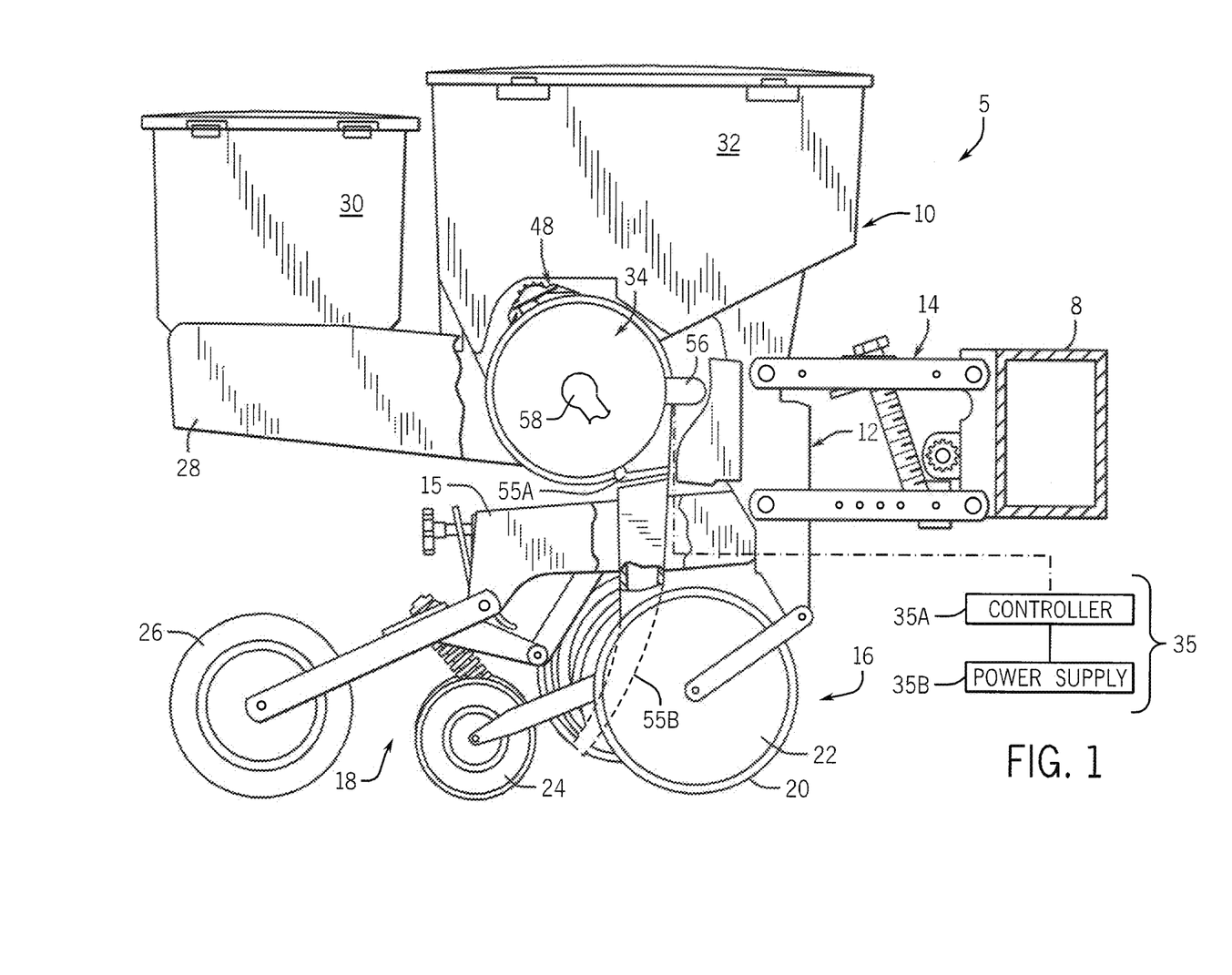
FIG. 1 illustrates a side elevational view of a portion of a seed planter incorporating a seed meter in accordance with the present invention.

Referring now to the drawings and specifically to FIG. 1, a portion of a multiple row crop planter implement or seed planter 5 is shown. The seed planter 5 is typically pulled by a tractor or other traction device (not shown). Seed planter 5 includes a main frame 8 that holds multiple individual row planting units 10, each row planting unit 10 being substantially identical. Only a single row planting unit 10 is shown for simplicity sake.

Still referring to FIG. 1, row planting unit 10 includes a sub-frame 12 that is connected to the main frame 8 by way of a parallel linkage system 14. The sub-frame 12 includes a backbone 15 that supports a furrow opening mechanism 16 and a furrow closing mechanism 18 that is arranged behind the furrow opening mechanism 16. The furrow opening mechanism 16 includes an opener disk(s) 20 that penetrates the soil and creates a furrow and gauge wheel 22 that has a limited displacement relative to the opener disk(s) 20. This allows the depth of the furrow to be selected by an operator by adjusting the amount of permitted movement of the gauge wheel 22 so as to control the depth to which the opener disk(s) 20 can penetrate the soil. The furrow closing mechanism 18 includes a closing disk(s) 24 that closes the furrow after the row planting unit 10 deposits seeds into the furrow and a press wheel 26 that rolls over the closed furrow to firm the soil over the seed to further close the furrow and promote favorable seed to soil contact.

Still referring to FIG. 1, the sub-frame includes a shelf 8 that is arranged above and generally parallel to the backbone 15. Shelf 28 is shown supporting an optional pesticide hopper 30 that contains, e.g., an herbicide or au insecticide, along with a known pesticide dispensing system (not shown) for applying controlled amounts of the contents in the desired location(s) while using the seed planter 5. Shelf 28 also supports a seed hopper 32 that holds the seed supply for planting by the row planting unit 10. The particular seed hopper 32 shown in FIG. 1 is configured to store the seed material row planting unit 10. In another embodiment, the seed is held in bulk storage in a primary seed hopper at a remote location, spaced from the various row planting units 10, whereby the seeds are supplied to the row planting units 10 pneumatically, or otherwise, through a seed conduit. Regardless of the particular configuration of seed hopper 32, the seeds are directed from the seed hopper 32 to a seed meter 34. A known vacuum source (not shown) is operably connected to a seed meter 34 for drawing a vacuum airflow to create a vacuum pressure inside of the seed meter 34, as described in greater detail elsewhere herein. Seed meter 34 is operably connected to a control system 35 that includes a controller 35A and power supply 35B, as is known, for controlling the seed meter 34. The controller 35A can include an industrial computer or, e.g., a programmable logic controller (PLC), along with corresponding software and suitable memory for storing such software and hardware including interconnecting conductors for power and signal transmission for controlling electronic or electro-mechanical components of the system seed meter 34.

Figure 2:
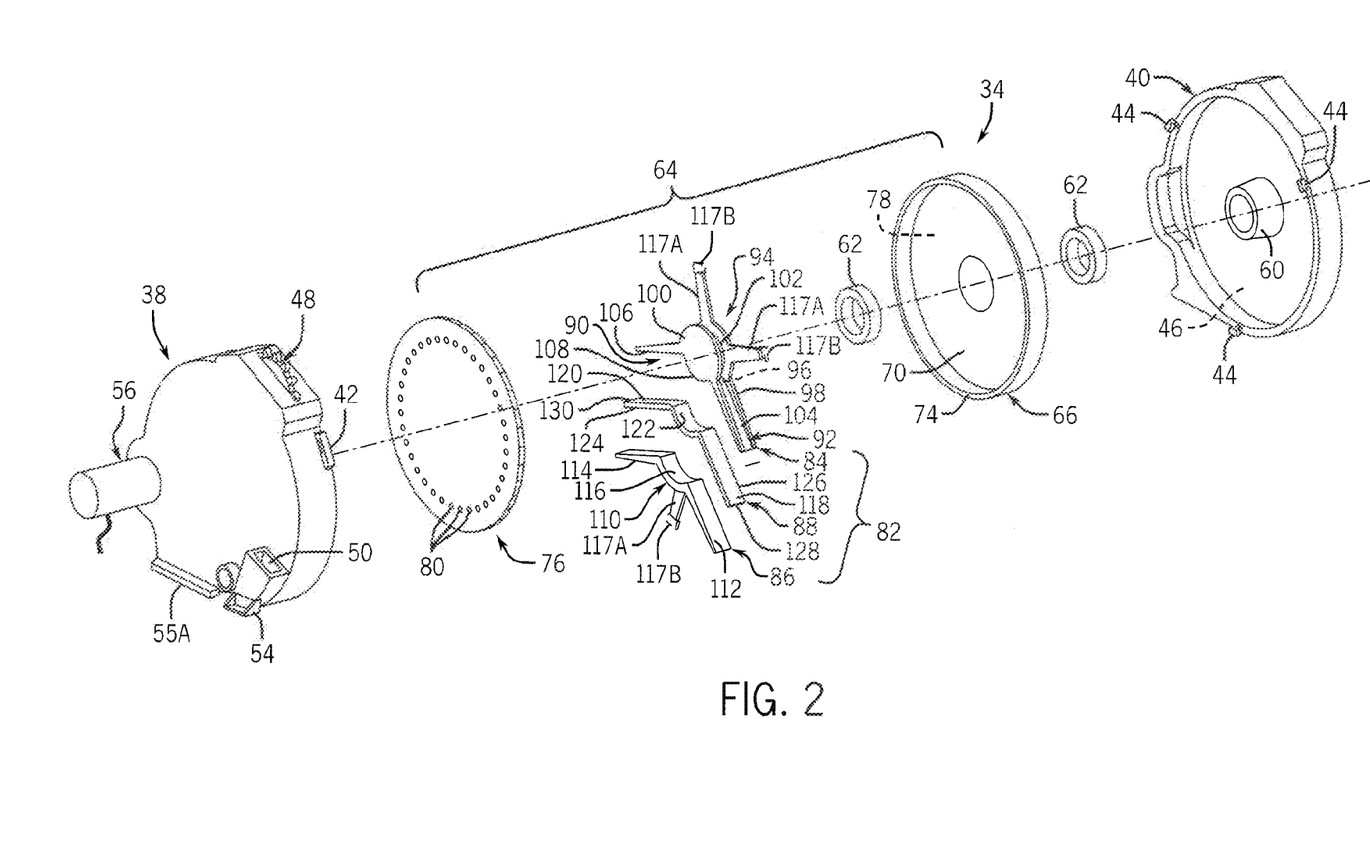
FIG. 2 illustrates an exploded pictorial view of the seed meter shown in FIG. 1 taken from above and behind the meter cover.
Figure 3:
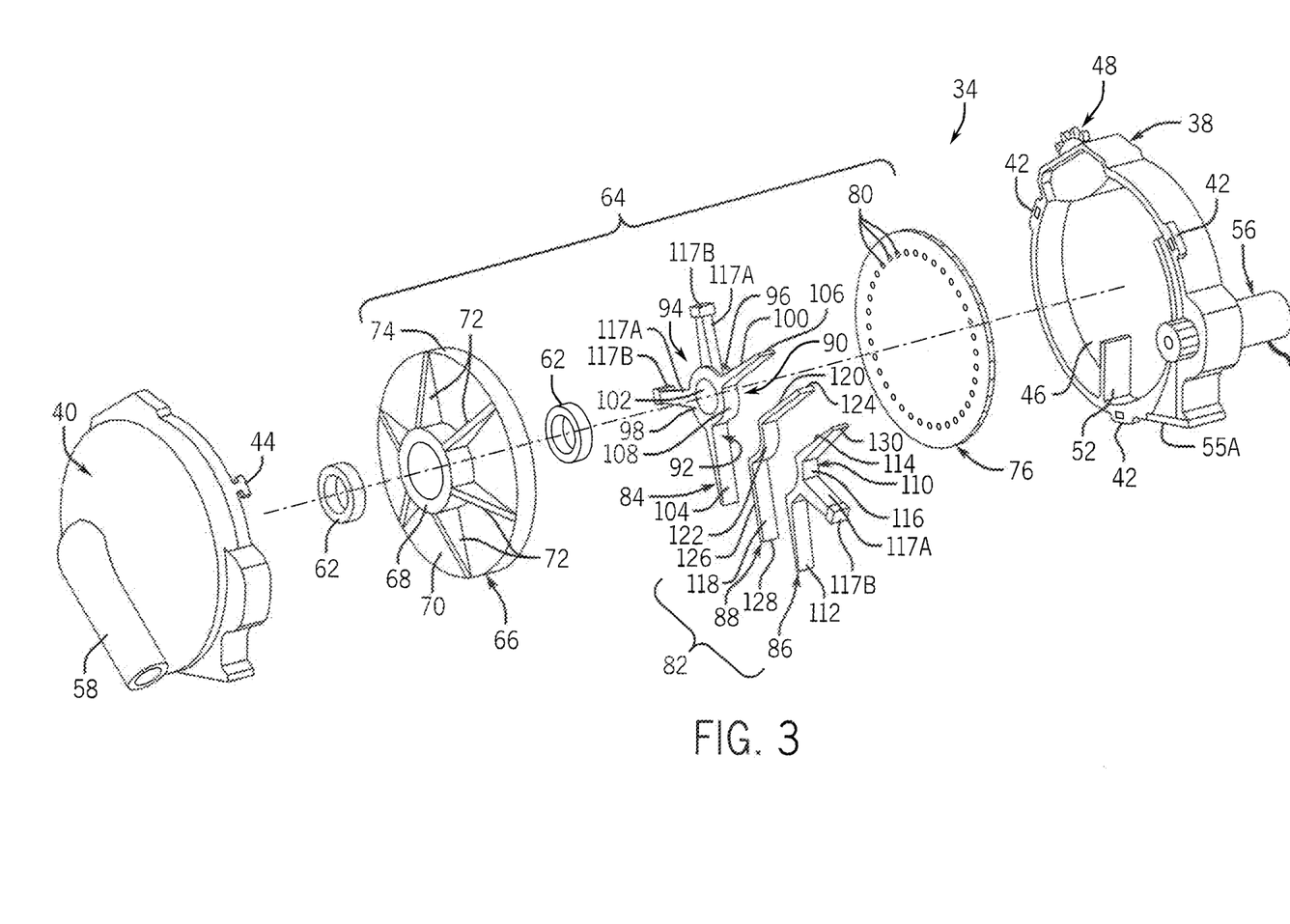
FIG. 3 illustrates an exploded pictorial view of the seed meter shown in FIG. 1 taken from above and behind the seed disk assembly cover.

Referring now to FIGS. 2 and 3, the seed meter 34 includes a meter housing 38 that supports the entire seed meter 34 and its components and temporarily holds the seed that is being metered. The meter housing 38 includes a seed disk assembly cover 40 that engage each other at respective outer peripheries. The meter cover 38 and seed disk assembly cover 40 include slots 42 and tabs 44 that engage each other upon rotation of the meter and seed covers 38, 40 so as to secure the meter and seed disk assembly covers 38, 40 together in a cam-locking-type manner. In another embodiment, latches (not shown) are provided on the meter and seed disk assembly covers 38, 40 for securing the meter and seed disk assembly covers 38, 40 together. When the meter and seed disk assembly covers 38, 40 are secured together, the meter housing 38 defines an enclosure with a meter housing cavity 46 therein.

Referring to FIGS. 2 and 3, a seed singulator 48 that is configured to inhibit more than one seed from being discharged from the seed meter 34 per seed discharge event is arranged on the meter housing 38. A seed opening 50 (FIG. 2) extends into the meter cover 38 and provides an entry through which the seed enters the seed meter 34 and is held in an area of the meter housing cavity 46 that is confined by a divider wall 52 (FIG. 3) and seed disc 76. A hinged cover door 54 (FIG. 2) covers a seed clean-out exit hole (not shown) that can be pivoted open and serves as a funnel to clean out the seed meter 34 when it is not being used. A seed outlet 55A directs the seed being delivered out of the seed meter 34 and to a seed tube 55B (FIGS. 1 and 4) for depositing the seed into a seed bed. A drive assembly 56 is mounted to the meter cover 38 for driving the rotating components of the seed meter 34. Drive assembly 56 includes an electric motor and drive gear(s) and is operably connected to the control system 35 (FIG. 1). A suitable drive assembly 56 is disclosed in commonly owned U.S. Pat. No. 7,617,785, entitled Direct Electric Drive Seed Meter, which is incorporated herein by reference in its entirety. It is understood that the drive assembly 56 may have other configurations to mechanically drive the seed meter 34, such as drive shafts, chains and belts, peg and hole drive systems, and others.

Still referring to FIGS. 2 and 3, vacuum inlet 58 (FIG. 3) is connected by way of a vacuum supply hose (not shown) to the vacuum source. The vacuum inlet 58 (FIG. 3) connects to a spindle 60 (FIG. 2) that extends from an inwardly facing surface of the seed disk assembly cover 40, axially into the meter housing cavity 46. A pair of bearings 62 is arranged on the outer circumferential surface of the spindle 60 and supports a seed disk assembly 64 for rotation upon the spindle 60. The disk assembly 64 can rotate upon and is sealed with respect to the spindle 60, so that the vacuum source creates a vacuum pressure within the seed disk assembly 64, while the meter housing cavity 46 remains substantially at an ambient pressure.

Referring to FIG. 3, the seed disk assembly 64 includes a support plate 66 that has a hub 68 in which the bearings 62 are mounted and a back wall 70 that is attached to an end of the hub 68. Multiple support webs 72 extend between and connect an outer circumferential surface of the hub 68 to a rearward facing surface of the back wall 70. Referring to FIG. 2, a collar 74 extends in an axial direction from an outer perimeter of the support plate back wall 70. A seed disk 76 is mounted to the support plate collar 74 so that a seed disk assembly cavity 78 (FIG. 2) is defined between the support plate 66 and the seed disk 76.

Referring again to FIGS. 2 and 3, the seed disk 76 can be mounted to the support plate collar 74 by way of screws or other fasteners. This may allow the seed disk 76 to be removed from the support plate collar 74 for installation of another seed disk 76 so as to accommodate different seed disks 76 for planting different types of seed. The seed disk 76 has a geared outer circumferential surface, with radially extending gear teeth that intermesh with the drive gear(s) of the drive assembly 56, which allows the seed disk assembly 64 to be rotated by the drive assembly 56. In another embodiment, the drive assembly 56 rotates the seed disk assembly 64 by engaging and driving a geared surface provided on the support plate collar 74 or provided on the hub 68. As is known, seed disk 76 includes seed pockets 80 that are discrete openings that include holes that extend between front and back surfaces and thus through the entire thickness of the seed disk 76. The seed pockets 80 are spaced from each other and, in this embodiment, are arranged in a single circle-shaped pattern. In other embodiments of the seed disk 76 that are configured for planting relatively small seeds like soybeans and sorghum, relatively more seed, pockets 80 are provided and are arranged in patterns of multiple concentric circles so that the seed pockets 80 occupy a relatively larger percentage of the surface area of the seed disk 76.

Referring still to FIGS. 2 and 3, a wiper assembly 82 is arranged within the seed disk assembly cavity 78. The wiper assembly 82 remains in a fixed position within the seed meter 34 while the support plate 66 and the seed disk 76 rotate about the wiper assembly 82. Wiper assembly 82 includes an inner bracket 84 and an outer bracket 86 that support a wiper seal 88 from opposing sides. The inner bracket 84 includes a closed lower end 90 that includes a wiper seal support wall 92, and an upper open end 94 includes an elongate opening 96 between side plates 98, 100 that extend from the wiper seal support wall 92 so that the opening 96 faces radially away from the spindle 60. Side plate 98 includes a hole 102 that fits over and seals against the spindle 60 (FIG. 2) of the seed disk assembly cover 40. The side plate 100 can be spaced from an end of the spindle 60 so that a vacuum airflow path can flow through the opening 96 in the inner bracket open end 94, through the space between the side plate 100 and the end of the spindle 60, and into the opening of and through the spindle 60, toward the vacuum source. In another embodiment, the spindle 60 abuts the side plate 100 and has a radially extending bore that extends though the circumferential side wall of the spindle 60 and communicates with the opening 96 in the inner bracket open end 94, so that the vacuum airflow can be directed through the inner bracket open end 94 and into and through the spindle 60.

Referring again to FIGS. 2 and 3, the wiper seal support wall 92 includes first, second, and third segments 104, 106, 108. The first and second segments 104, 106 extend transversely between the support plate back wall 70 and seed disk 76 and longitudinally through the seed disk assembly cavity 78 in different directions along generally straight-line paths. An angle defined between the first and second segments 104, 106 of the wiper seal support wall 92 can be greater than about 90 degrees, for example, between about 95 degree and about 120 degrees. The third segment 108 of the wiper seal support wall 92 is arcuate spaced radially from the spindle 60 extending between and connecting the first and second segments 104, 106 to each other.

Referring still to FIGS. 2 and 3, outer bracket 86 includes a wiper seal support wall 110 that is substantially analogous to the wiper seal support wall 92 of the inner bracket 84. Outer bracket wiper seal support wall 110 first and second segments 112, 114 extend transversely across the seed disk assembly cavity 78 and longitudinally in a different direction through the seed disk assembly cavity 78. An arcuate third segment 116 extends between and connects the first and second segments 112, 114 to each other.

Figure 4:
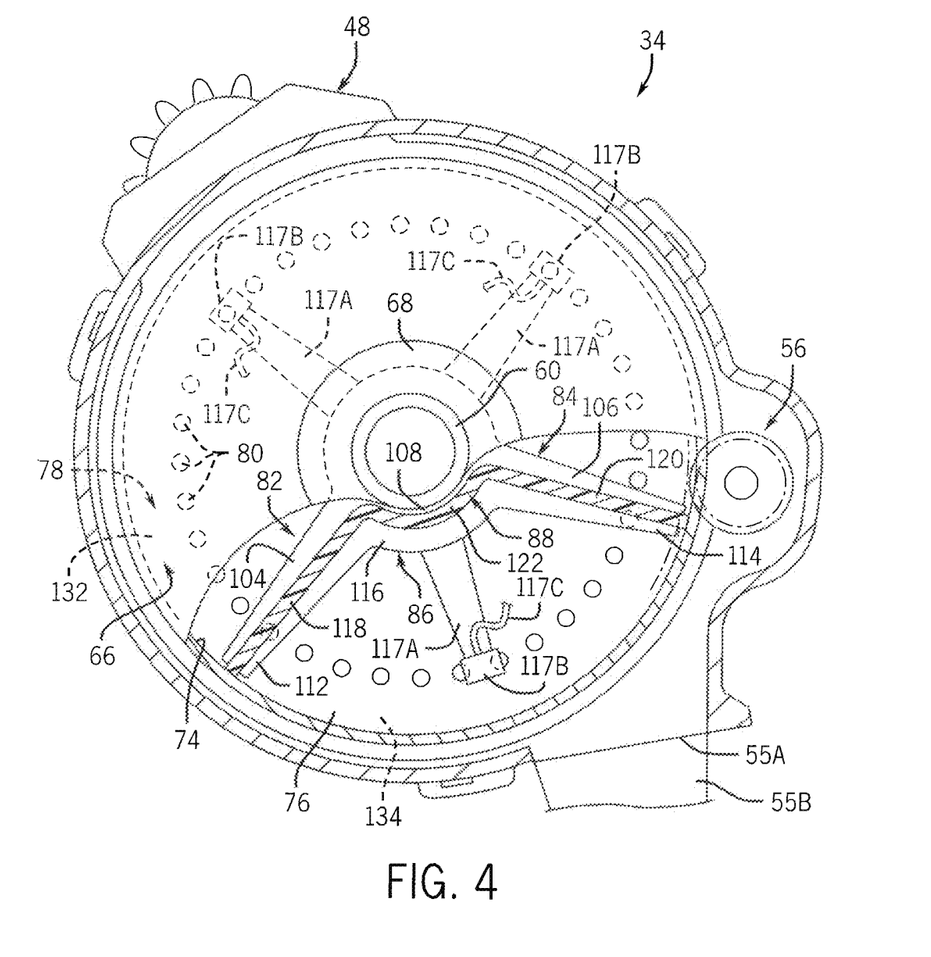
FIG. 4 illustrates a partial cross-sectional view of the seed meter of FIG. 1 facing the meter cover.

Referring now to FIGS. 2-4, support arms 117A extend radially outward from the inner and outer brackets 84, 86. A sensor 117B is arranged at an end of each of the support arms 117A so that the sensor 117B is aligned with the seed pockets 80. The sensor(s) 117B is configured to detect whether a seed is in each pocket 80. This can be done by using a light sensor as sensor(s) 117B, whereby detecting light through one of the pockets 80 indicates that there is no seed in the pocket 80. The sensors 117B are spaced from each other within the seed disk assembly cavity 78. Two sensors 117B are shown as extending from the inner bracket 84 on opposing sides of the singulator 48. Detecting an absence of seeds in the seed pockets 80 upstream or before the singulator 48 may indicate that there is not enough agitation in the seed meter 34 so that the seeds have become clumped and stuck together, or that there is not enough vacuum pressure being created in the rotating seed disk assembly 64 to pull and hold the seeds against the pockets 80 of the seed disk 76. Detecting an absence of seeds in the seed pockets 80 downstream or after the singulator 48 may indicate that the singulator 48 is set too aggressively and is knocking all of the seeds from the seed pockets 80. A third sensor 117B may extend from the outer bracket 86, into a portion of the seed meter 34 at which the seeds drop from the seed disk 76 and fall through the seed outlet 55A. Detecting seeds present in the seed pockets 80 at this location may indicate that the vacuum pressure is too high, a seed is wedged into the seed disk hole, or that the seal integrity of the wiper seal 88 has been compromised. The sensors 117B are operably connected to the control system 35 (FIG. 1) by way of conductors 117C in a known manner to display a signal to an operator that there is a problem with seed meter 34 and/or to automatically implement a corrective action.

Referring again to FIGS. 2 and 3, wiper seal 88 is sandwiched between the wiper seal support walls 92, 110 of the inner and outer brackets 84, 86. Whereas the inner and outer brackets 84, 86 are made from rigid materials, such as plastic or metal materials, the wiper seal 88 is made from a resilient material such as rubber or other elastomeric material that allows the wiper seal 88 to provide a sealing action against surfaces with which it contacts. Like the wiper seal support walls 92, 110 of the inner and outer brackets 84, 86, the wiper seal 88 includes first, second, and third segments 118, 120, 122. The first and second segments 118, 120 of the wiper seal 88 extend transversely across the seed disk assembly cavity 78 and longitudinally in a different direction through the seed disk assembly cavity 78. The third segment 122 is arcuate and extends between and connects the first and second segments 118, 120 of the wiper seal 88 to each other. Along the entire length of the wiper seal 88, including the first, second, and third segments 118, 120, 122, the wiper seal 88 defines a pair of opposing side edges 124, 126. First edge 124 engages an inwardly facing surface of the seed disk 76, and second edge 126 engages an inwardly facing surface of the support plate 66. End edges 128, 130, extend transversely between and connect the side edges 124, 126 to each other. The end edges 128, 130 engage an inner circumferential surface of the support plate collar 74 at two spaced-apart locations, extending the entire distance between the support plate back wall 70 and the seed disk 76.

Referring now to FIGS. 2-4, with the wiper seal 88 continuously engaging the support plate back wall 70 and collar 74 (FIGS. 2 and 3) and the seed disk 76, the wiper seal 88 seals and separates a portion of the seed disk assembly cavity 78 away from the remainder of the seed disk assembly cavity 78. In this way, the wiper seal 88 defines a boundary within the seed disk assembly 64 (FIGS. 2 and 3) between a vacuum zone 132 and a non-vacuum zone 134. The vacuum zone 132 is on the same side of the wiper seal 88 as the seed disk assembly cover spindle 60 and the opening 96 (FIGS. 2 and 3) of the inner bracket 84. In this way, the vacuum zone 132 is fluidly connected to the vacuum source through the opening 96 of the inner support bracket and the spindle 60, as the vacuum source evacuates air from within the vacuum zone 132 which creates a vacuum airflow toward the vacuum source and a vacuum and thus negative pressure within the vacuum zone 132. The non-vacuum zone 134 is sealed away and mechanically separated from such vacuum pressure by the engagement of the wiper seal 88 with the respective surfaces of the seed disk assembly 64 as it rotates past and wipes over the fixed wiper seal 88, such that the non-vacuum zone 134 may define a cutoff chamber.

Figure 5:
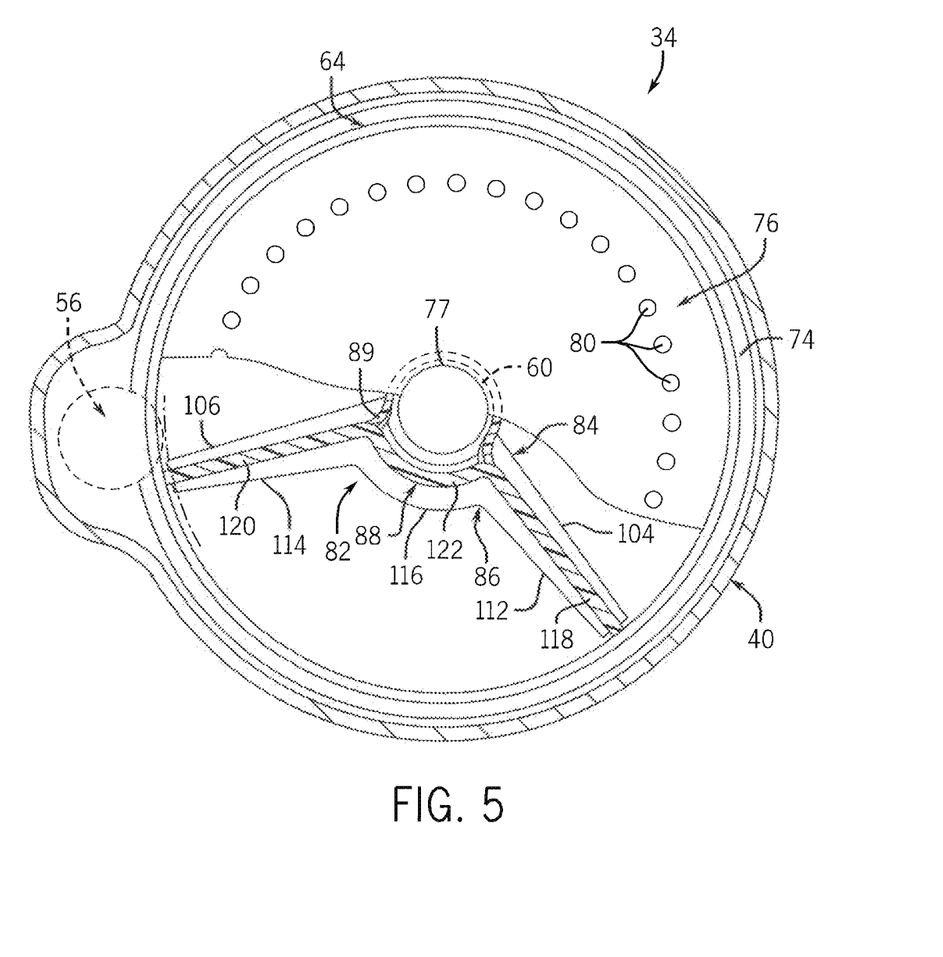
FIG. 5 illustrates a partial cross-sectional view, facing the seed disk, of a variant of the wiper assembly of FIG. 4.

Referring now to FIG. 5, the wiper assembly 82 is mostly identical to those described with respect to FIG. 2-4, whereby such descriptions are applicable here with respect to the wiper assembly 82 of FIG. 5. FIG. 5 illustrates the wiper assembly 82 from the opposite side of the seed meter 34 as that of FIG. 4, namely from the meter cover 38 side facing toward the outwardly facing surface of the seed disk 76, and without the support arms 117A and sensors 117B. The wiper assembly 82 of FIG. 5 differs from those described in FIGS. 2-4 in the following ways. Referring to FIG. 5, between the wiper first and second segments 118, 120, the wiper third segment 122 is cut down or shorter so that at least a portion of the third segment 122 is spaced from the seed disk 76. A hole 77 extends through a central portion of the seed disk 76. The hole 77 allows ambient air or air at a greater than ambient pressure into the non-vacuum zone 134 of the seed disk assembly cavity 78 because the hole 77 is fluidly connected to the non-vacuum zone 134 through the gap between the third segment 122 and the seed disk 76. In this way, the gap between the third segment 122 and the seed disk 76 defines an ambient air flow-path into the non-vacuum zone 134 that supplements ambient air flow into the non-vacuum zone 134 through the empty seed pockets 80. Relatively less ambient air is drawn through the empty seed pockets 80 in order to maintain the non-vacuum zone 134 at an ambient pressure because the gap between the third segment 122 and the seed disk 76 provides a passage of a relatively large cross-sectional area through which ambient air may flow.

Still referring to FIG. 5, a central seal 89 is arranged upon the inner bracket 84 and is connected at its ends to the wiper seal 88 and extends upwardly away from the wiper seal 88. The central seal 89 acts as a face seal that seals against a surface of the seed disk 76 that faces into the seed disk assembly cavity 78, radially outside of the hole 77. In this way, the central seal 89 and the third segment 122 of the wiper seal 88 extend about the entire periphery of the hole 77, with the central seal 89 contacting and the third segment 122 spaced from the seed disk 76 so that the first and second segments 118, 120 of the wiper seal 88 and the central seal 89 collectively define a boundary between the vacuum and non-vacuum zones 132, 134. In another embodiment, the central seal 89 is not provided, but instead sealing is provided between the interfacing surfaces of the inner bracket 84 and the seed disk 76 which may optionally allow for some amount of vacuum leakage through the interfacing inner bracket 84 and seed disk 76, so long as seeds can be sufficiently held in the seed pockets 80 by vacuum in the vacuum zone 132 and can fall out of the seed pockets 80 in the cutoff chamber that corresponds to the non-vacuum zone 134.

In light of the above, during use of the seed meter 34, seed is delivered from the seed hopper 32 (FIG. 1) through the seed opening 50 (FIG. 2), and is temporarily held in the meter housing cavity 46 in an area that is confined by the divider wall 52 and seed disc 76 (FIG. 3). The drive assembly 56 rotates the seed disk assembly 64 at a rotational speed that corresponds to the ground speed of the particular row planting unit 10. The vacuum source pulls a vacuum airflow from the vacuum zone 132 (FIG. 4) of the seed disk assembly cavity 78, which is directed through the opening 96 (FIGS. 2 and 3) of the inner bracket 84, through the seed assembly cover spindle 60 (FIG. 2), and through the vacuum inlet 58 and vacuum supply hose, to the vacuum source. Seed pockets 80 that rotate into the vacuum zone 132 are subjected to the negative pressure, whereby air is drawn through the seed pockets 80 which pull and hold seeds from the meter housing cavity 46 into the seed pockets 80. The vacuum pressure holds the seeds in the seed pockets 80 while the seed disk 76 and support plate 66 rotate so that the pockets 80 rotate past the sensors 117B before and after the singulator 48 that detect whether the seeds remain in the pockets 80. When the pockets 80 rotate into the non-vacuum zone 134, the pockets 80 are not longer subjected to the vacuum pressure inside of the seed disk assembly 64. Ambient air or air at greater than ambient pressure of the seed disk assembly cavity 78 flows into the non-vacuum zone 134 through the holes of the empty pockets 80 and may also leak past the seeds within the pockets 80 or flow through the hole 77 (FIG. 5) and through the gap between the wiper seal third segment 122 and the seed disk 76 (FIG. 5). This equalizes the pressure between the non-vacuum zone 134 which remove the vacuum pressure that holds the seeds in the pockets 80 and the seeds fall from the pockets 80 by gravity through the seed outlet 55A and seed tube 55B (FIGS. 1 and 4), and into the seed bed.

Many changes and modifications could be made to the invention without departing from the spirit thereof. The scope of these changes will become apparent from the appended claims.

We claim:

1. A seed meter, comprising:
a housing assembly that defines a housing cavity, the housing cavity including a seed portion for receiving seeds therein; and
a seed disk assembly that is arranged for rotation inside of the housing cavity, the seed disk assembly including,
a support plate that has a back wall;
a seed disk having first and second sides and being mounted to the support plate, the first side of the seed disk communicating with seeds received in the seed portion of the housing cavity and the second side being directed toward the support plate such that a seed disk assembly cavity is defined between the support plate back wall and the second side of the seed disk; and
a wiper seal that is arranged within the seed disk assembly cavity and that extends between and engages each of the support plate back wall and the seed disk so as to create a seal that divides the seed disk assembly cavity into a vacuum zone in which is connectable to a vacuum pressure such that the vacuum pressure in the vacuum zone of the seed disk assembly cavity holds seeds received in the seed portion of the housing against the seed disk and a non-vacuum zone in which the seeds are not held against the seed disk by vacuum pressure.

2. The seed meter of claim 1 wherein the housing assembly includes a spindle that is hollow and connected to a vacuum source and that extends inwardly into the housing cavity, the vacuum source generating the vacuum pressure in the vacuum zone of the seed disk assembly cavity.

3. The seed meter of claim 2 wherein the seed disk assembly is mounted for rotation with respect to, and operably connected to, the spindle so that a vacuum airflow that is created by the vacuum source is drawn from the vacuum zone of the seed disk assembly and through the spindle of the housing assembly.

4. The seed meter of claim 3 wherein the wiper seal is fixed with respect to the spindle so that the seed disk assembly slides across the wiper seal when the seed disk assembly rotates.

5. The seed meter of claim 1 wherein the seed disk assembly support plate includes a collar that extends in an axial direction from an outer perimeter of the support plate back wall and the seed disk is mounted to the collar such that a boundary of the seed disk assembly cavity is defined between the seed disk, the support plate back wall, and the support plate collar.

6. The seed meter of claim 5 wherein the wiper seal includes a pair of opposing side edges that engage the seed disk assembly support plate and seed disk, and an end edge that engages the support plate collar.

7. The seed meter of claim 5 wherein the wiper seal includes a first segment that extends through the seed disk assembly cavity generally radially in a first direction, and a second segment that extends through the seed disk assembly cavity generally radially in a second direction that is different from the first.

8. The seed meter of claim 7 wherein the first and second segments of the wiper seal assembly define an angle of greater than about 90 degrees therebetween.

9. The seed meter of claim 1 further comprising an inner bracket that is arranged and fixed within the seed disk assembly cavity and that supports the wiper seal from a position that is relatively nearer a central axis of the cavity that the wiper seal.

10. The seed meter of claim 9 wherein the housing assembly includes a spindle that is hollow and connected to a vacuum source and that extends inwardly into the housing cavity, and the seed disk assembly is mounted for rotation with respect to and operably connected to the spindle so that a vacuum airflow that is created by the vacuum source is drawn from the vacuum zone of the seed disk assembly cavity and through the spindle of the housing assembly.

11. The seed meter of claim 10 wherein the inner bracket is mounted to the housing assembly spindle and includes a wiper seal support wall that engages the wiper seal and an opening that is spaced from the wiper seal support wall and that communicates with the housing assembly spindle so that the vacuum airflow can be drawn through the opening of the inner bracket before entering the spindle.

12. The seed meter of claim 11 wherein the opening of the inner bracket is defined between a pair of side plates that extend from the wiper seal support wall.

13. A seed meter, comprising:
a housing assembly defining a housing cavity and including a hollow spindle extending into the housing cavity and being connectable to a vacuum source, the housing cavity including a seed portion for receiving seeds therein; and
a seed disk assembly that is arranged for rotation inside of the housing cavity, the seed disk assembly including,
   a support plate that has a back wall and a collar that extends from a perimeter of the back wall;
   a seed disk having first and second sides and being mounted to the support plate collar, the first side of the seed disk communicating with seeds received in the seed portion of the housing cavity and the second side being directed toward the support plate such that a seed disk assembly cavity is defined between the second side of the seed disk and the support plate back wall;
   an inner bracket that is arranged in the seed disk assembly cavity in a fixed position with respect to the spindle and has an opening that is in fluid communication with the spindle and a wiper seal support wall that extends generally transversely between the seed disk and the support plate back wall; and
   a wiper seal that engages the wiper seal support wall of the inner bracket and includes a first segment that extends in a first direction across the seed disk assembly cavity and a second segment that extends in a second, different direction across the seed disk assembly, each of the first and second segments of the wiper seal including opposing side edges that engage the seed disk assembly support plate and seed disk and an end edge that engages the support plate collar so as to create a seal that separates the seed disk assembly cavity into a vacuum zone which communicates with the opening inner bracket such that a vacuum airflow is conveyed from the vacuum zone to the spindle which holds seeds received in the seed portion of the housing cavity against the second side of the seed disk and a non-vacuum zone that is exposed to at least one of an ambient pressure and a greater than ambient pressure so that the seeds are not held against the seed disk by vacuum pressure.

14. The seed meter of claim 13 wherein the wiper seal includes a third segment that extends between and connects the first and second segments to each other.

15. The seed meter of claim 14 wherein each of the first and second segments of the wiper seal is generally straight and wherein the third segment of the wiper seal is arcuate.

16. The seed meter of claim 15 further comprising an outer bracket that is arranged and fixed within the seed disk assembly cavity and that supports the wiper seal from a position that is relatively further from the central axis of the cavity that the wiper seal.

17. The seed meter of claim 16 wherein the wiper seal is sandwiched between the inner and outer brackets.

18. The seed meter of claim 16 wherein at least one of the inner and outer brackets includes an arm extending therefrom and wherein a sensor is mounted to the arm for determining a presence of a seed in an opening of the seed disk.

19. A seed meter, comprising:
a housing assembly defining a housing cavity having a seed portion substantially maintained at ambient pressure and including a spindle that is hollow and connectable to a vacuum source; and
a seed disk assembly that is arranged for rotation inside of the housing cavity, the seed disk assembly including:
   a support plate that has a back wall and a collar that extends from a perimeter of the back wall;
   a seed disk having a first side communicating with seeds received in the seed portion of the housing cavity, a second side and seed pockets that include holes extending through the seed disk in an axial direction and being mounted to the support plate collar so that the support plate and the seed disk of the seed disk assembly rotate in unison with each other, the second side of the seed disk and the support plate back wall defining seed disk assembly cavity therebetween;
   an inner bracket that is arranged in the seed disk assembly cavity in a fixed position with respect to the spindle and has an opening that is in fluid communication with the spindle and a wiper seal support wall that extends generally transversely between the seed disk and the support plate back wall; and
   a wiper seal that engages the wiper seal support wall of the inner bracket and includes a first segment that extends in a first direction across the seed disk assembly cavity and a second segment that extends in a second, different direction across the seed disk assembly, each of the first and second segments of the wiper seal including opposing side edges that engage the seed disk assembly support plate and seed disk and an end edge that engages the support plate collar so as to create a seal that separates the seed disk assembly cavity into a vacuum zone that is arranged on a first side of the wiper seal and that is fluidly connectable to the vacuum source through the opening in the inner bracket such that the vacuum source provides vacuum pressure to seed pockets that are aligned with the vacuum zone of the seed disk assembly for holding seed in the seed pockets and a non-vacuum zone arranged on a second side of the wiper seal and having a sufficiently greater than a pressure within the vacuum zone so that the seeds are not held against the seed disk by vacuum pressure provided by the vacuum source.

20. The seed meter of claim 19 wherein the opening of the inner bracket faces radially away from the spindle.

* * * * *